Figure 1:
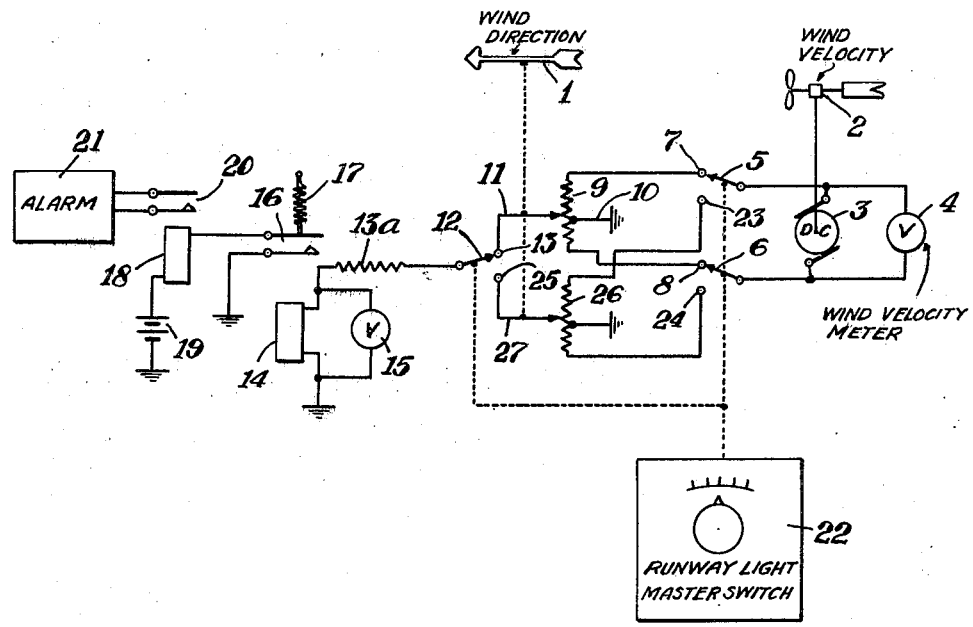

Nov. 25, 1952  R. E. GRAY  2,619,527
AIRPORT WIND INDICATING AND WARNING SYSTEM
Filed Dec. 31, 1949  2 SHEETS—SHEET 1

INVENTOR
RICHARD E. GRAY
BY R. P. Morris
ATTORNEY

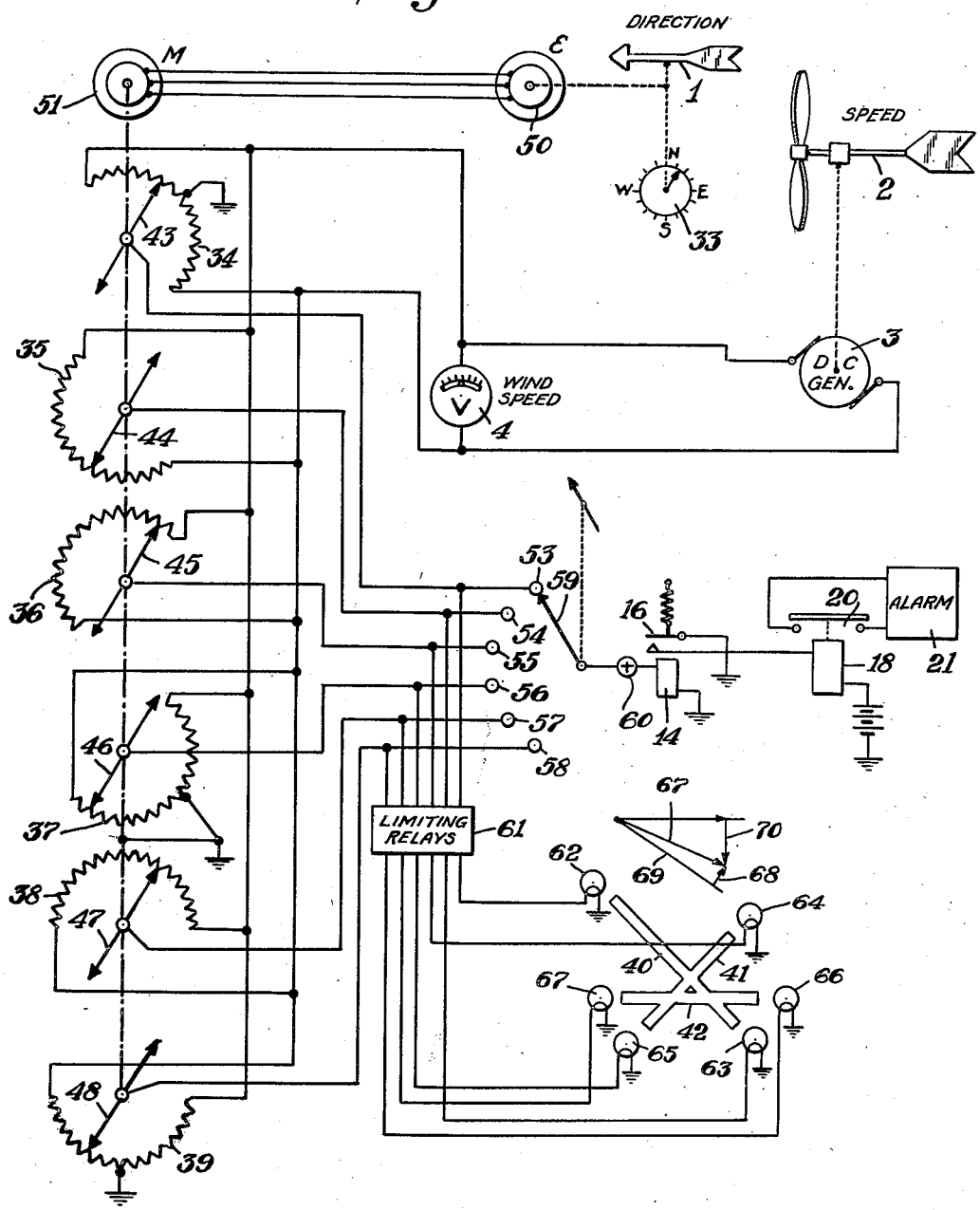

Patented Nov. 25, 1952

2,619,527

UNITED STATES PATENT OFFICE 2,619,527

AIRPORT WIND INDICATING AND WARNING SYSTEM

Richard Edmund Gray, New York, N. Y., assignor to International Standard Electric Corporation, New York, N. Y., a corporation of Delaware Application December 31, 1949, Serial No. 136,356

7 Claims. (Cl. 177—352.5)

This invention relates to airport wind-indicating and warning systems and more particularly to systems for providing warning or indications of dangerous cross wind conditions on the landing runway.

In landing aircraft at airports it is necessary to consider wind conditions so that the safest of the available runways for landing may be utilised by the craft. In general there is usually one runway at any airport which is longer than the others and is the most desirable for use particularly for larger aircraft. However, when the wind is from such a direction and of such strength that a dangerous cross wind component exists at this runway one of the others must be used or if all of them are dangerous none can be used.

Systems have been proposed utilising wind direction indications for turning on signal or landing lights automatically in accordance with the direction of the wind. Such systems have the disadvantage that the lights will be shifted to illuminate different runways if the direction of the wind is different regardless of its velocity. Thus if a cross wind directly at right angles to a runway is present the switching is accomplished even though this wind might not be over 10-12 miles per hour and landing perfectly safe.

The fact that the velocity of the wind also is important in providing lighting or warning systems has also been recognised. One system has been proposed in which a wind direction indicator is used to set up a circuit which would tend to light up a different runway if the wind direction is adverse. This circuit however is not completed unless the wind velocity is sufficiently high to operate a switch to complete the change over. Such a system is an improvement over the direct wind operated switching but fails to include any features which would serve to indicate a dangerous condition at all of the runways. Furthermore, the switching would be accomplished at some arbitrary wind velocity providing the wind direction was not favorable without taking into consideration the actual wind component at right angles to the runway which is the only one actually to be considered.

It is an object of this invention to provide a system for determining dangerous wind conditions at an airport which will provide an indication or alarm in the event the wind velocity component at right angles to the runway exceeds a predetermined value.

According to this invention a system is provided to generate electrical energy substantially proportional to the wind velocity and to use a wind direction determining device to adjust an element of a responsive means to which the generated voltage is applied in accordance with the wind direction so that a component of the energy proportional to the component of wind velocity at right angles to the runway will be provided. This energy may be measured to indicate the magnitude of the adverse wind component or may be applied to operate an alarm device to indicate that the runway is not safe for use.

According to a feature of my invention I provide an electric power generator the energy of which is applied across a potentiometer wound to produce a change in the energy as the slider is moved over it proportional to a sine component of an angle between the slider and the zero point of the potentiometer. The potentiometer sliders are controlled in accordance with the direction of the wind so that the voltage drop across the potentiometer portion tapped by the slider will be a measurement of the component of wind velocity crossways of the runway. By measuring this voltage or the current developed thereby on a properly calibrated meter the strength of the wind component may be directly read. The voltage developed across the potentiometer may alternatively be fed to a relay which will serve to operate an alarm or warning light indicating dangerous wind conditions. The relays may be adjusted so that they will not operate until the wind component is sufficiently high to provide dangerous landing conditions.

Figure 2:
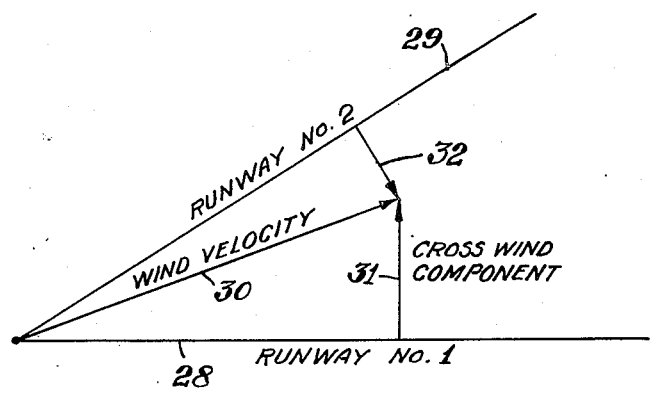

The above-mentioned and other features and objects of this invention and the manner of attaining them will become more apparent and the invention itself will be best understood by reference to the following description of an embodiment of the invention taken in conjunction with the accompanying drawings, in which Fig. 1 is a schematic circuit diagram of a system incorporating the features of this invention;

Fig. 2 is a vector diagram used in explaining the operation of the system of Fig. 1; and Fig. 3 is a circuit diagram of an alternative arrangement incorporating features of this invention.

Turning now to Fig. 1, a weather vane or other wind direction indicating device is shown at 1 and a windmill is shown at 2 which serves to operate at a speed substantially proportional to the wind velocity. A more accurate measurement of wind velocity may be obtained by the usual anemometer cup arrangement but since in this case it is desired to drive a generator of some power the windmill structure is preferred. For the purposes herein used precise wind velocity indication is not necessary. Windmill 2 operates a direct current generator 3 which will, therefore, produce an output voltage substantially proportional to the wind velocity. This may be measured on a meter 4 for example to give a direct indication of this velocity. Output energy from generator 3 is applied over switch arms 5 and 6 and contacts 7 and 8 to a potentiometer resistor 9 grounded at its midpoint as shown at 10. A potentiometer slider is shown at 11 mechanically coupled with wind direction indicator 1 so that the slider will be displaced along potentiometer 9 an amount determined by the wind direction. The potentiometer resistor 9 is proportioned so that the voltage drop there across between ground 10 and potentiometer slider 11 is proportional to a sine function. The resistor 9 is so arranged with respect to the landing runway that this sine function is the sine of the angle made between the wind direction and the direction of the run-way. The slider 11 may be coupled through a switch arm 12 and contact 13 through a resistor 13a to a micro relay having a winding 14. A meter 15 calibrated in wind velocity may be bridged across winding 14 to provide a measurement proportional to the voltage drop across resistor 9. Thus, the meter 15 will provide a reading of wind velocity at right angles to the runway. Relay 14 is adjusted to control the closing of a pair of relay contacts 16 by operation of current from potentiometer 9 through winding 14. Contacts 16 may be adjusted by adjusting spring 17 so that the closure of these contacts will be made for a predetermined value of current through winding 14. This is made adjustable so that the closure may be effected for different cross wind velocities. Contacts 16 when closed energise a power relay 18 from battery 19 through contacts 16 to ground closing contacts 20 to operate alarm device 21. It will be readily seen that with this arrangement a positive warning will be provided whenever the cross wind velocity reaches the predetermined dangerous value. At the same time a reading of the cross wind component will at all times be available. This feature is desirable since a cross wind velocity of 25-30 miles per hour may be safe for landing of certain types of craft while the same velocity may be dangerous for an attempted landing of other types of craft. Moreover, by having available this cross wind component reading, the information may be relayed to the pilot so that he will know how to take care of drift in making his landing.

While the system as so far described is sufficient to take care of conditions at a single runway it is generally provided that when conditions become dangerous on any given runway the man in the control tower may switch on the lights for a second runway. Under these circumstances it is desirable that the wind velocity indications be available also for this second runway. Accordingly when the runway light switch 22 is operated to turn on lights at a different runway, switch arms 5 and 6 and switch arm 12 may be simultaneously operated onto switch contacts 23 and 24, respectively, placing the output of direct current generator 3 across a second potentiometer 26 aligned with this second runway and coupling indicator 15 and alarm 21 to a second potentiometer slide arm 27 on potentiometer 26. Thus the wind velocity and wind direction indicators will provide a similar warning for this second runway.

In Fig. 2 is illustrated by way of example a vector diagram showing how the wind component is related to various runways. Thus lines 28 and 29 represent the direction line of runways 1 and 2, the wind vector is shown at 30. By calculating the sine of the angle made between vector 30 and line 28 the cross wind component 31 with respect to runway No. 1 is derived. Similarly by calculating the sine of the angle between vector 30 and line 29 cross wind component to runway No. 2 is calculated as represented by vector 22. In a similar manner the components with respect to all of the runways may be derived.

In Fig. 3 is shown a more elaborate control arrangement wherein the wind velocity components may be simultaneously provided for each of a plurality of runways. In this figure the wind direction indicator 1 and windmill 2 may be the same as in the previous figure. Also electrical generator 3 and wind velocity meter 4 are substantially the same. A wind direction indicator is shown at 33. The output voltage from generator 3 is applied in parallel across each of the sine potentiometers 34-39 inclusive. Potentiometers 34 and 35 are arranged to show the cross wind components with respect to the first runway 40, potentiometers 36 and 37 with respect to a second runway 41 and potentiometers 38 and 39 with respect to a third runway 32. The respective sliders for each of potentiometer resistors 34-39 indicated at 43-48 are controlled from wind direction indicator 1 through the shaft 49, selsyn generator 50, selsyn motor 51 and common drive shaft 52. Thus voltages may be provided simultaneously proportional to the cross wind component for each of said runways. The output voltages from the potentiometers may be brought out through all individual contacts 53-58 inclusive of a common switch arm 59. Contact 59 may be coupled through ammeter 60 which serves to indicate the cross wind component to relay 14 which in turn is coupled through switch contacts 16, power relay 18 to contacts 20 to an alarm device 21. Switch arm 59 may be selectively positioned to check any one of the runways by moving it over contacts 53 to 58 inclusive.

At the same time a simultaneous indication may be provided to show dangerous conditions at any one of the runways 41 and 42. This may be accomplished by coupling the actual potentiometer outputs over a group of relays 61 similar in construction for example to those indicated at 14-18, to individual warning lamps 62-67 inclusive. These lamps as well as a replica of the runways may be provided on an indicating board so that red lights may be shown at each of the points where dangerous wind conditions obtain. The vector diagram shown immediately adjacent these indicators shows at 67 the direction and strength of the wind and, at 68, 69 and 70 the cross wind components for runways 40, 41 and 42, respectively.

It will be readily understood that while a particular embodiment of the invention has been described many changes may be made therein without departing from the scope of my invention. For example, while direct current generators have been shown it is clear that alternating current generators controlled in voltage in accordance with the wind velocity could be used. Furthermore, other types of voltage producing means may be provided. Moreover, while high resistance types of potentiometers have been shown for the purpose of deriving a cross wind component, any type of circuit capable of producing this effect may be used. Furthermore, electronic relays may be used instead of the electro magnetic relays illustrated.

While I have described above the principles of my invention in connection with specific apparatus, it is to be clearly understood that this description is made only by way of example and not as a limitation to the scope of my invention.

What I claim is:

1. A system for determining dangerous wind conditions for landing aircraft on a plurality of differently disposed runways, comprising generator means for generating electrical energy substantially proportional to the wind velocity, wind direction determining means, responsive means for deriving from said energy under control of said wind direction determining means component energy individual to each runway and proportional to the component of wind velocity at right angles to each runway, a utilization device coupled to said responsive means, and means for coupling each of said means for deriving to said generator.

2. A system according to claim 1 wherein said means for deriving comprises a potentiometer coupled to said generator means, and a slider contact for said potentiometer controlled in position in response to said wind direction determining means.

3. A system according to claim 2 wherein the resistance of said potentiometer is proportioned to provide voltage drops proportional to the sine of the angle of the wind with respect to said runway.

4. A system according to claim 1 wherein said means for coupling comprises a switch for selectively connecting a desired one of said means-for-deriving to said generator.

5. A system according to claim 4, wherein said utilization device is common to all said runways further comprising means for selectively coupling said utilization device to a desired one of said means for deriving.

6. A system according to claim 1, wherein said means for coupling comprises means for connecting all said means for deriving in parallel to said generator.

7. A system according to claim 6, wherein said utilization device comprises alarm means individual to each runway and means coupling each alarm means to its respective means for deriving.

RICHARD EDMUND GRAY.

REFERENCES CITED

The following references are of record in the file of this patent:

UNITED STATES PATENTS

| Number | Name | Date |
| --- | --- | --- |
| 2,350,594 | Dallas | June 6, 1944 |
| 2,375,227 | Hillman | May 8, 1945 |
| 2,449,480 | Houck | Sept. 14, 1948 |
| 2,475,314 | Dehmel | July 5, 1949 |